(12) United States Patent
Ahamed et al.

(10) Patent No.: US 10,960,818 B2
(45) Date of Patent: Mar. 30, 2021

(54) ILLUMINATION FOR CAMERA BASED AUTOMOTIVE TRAILER FUNCTION

(71) Applicant: Continental Automotive Systems, Inc., Auburn Hills, MI (US)

(72) Inventors: Nizar Ahamed, Farmington Hills, MI (US); Abdulwahab Alkeilani, Bloomfield Hills, MI (US); James Hockridge Critchley, Lake Orion, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/576,256

(22) Filed: Sep. 19, 2019

(65) Prior Publication Data

US 2020/0094739 A1 Mar. 26, 2020

Related U.S. Application Data

(60) Provisional application No. 62/733,679, filed on Sep. 20, 2018.

(51) Int. Cl.
| | |
|---|---|
| *G08B 21/00* | (2006.01) |
| *B60Q 11/00* | (2006.01) |
| *B60R 16/03* | (2006.01) |
| *B60Q 1/30* | (2006.01) |
| *H05B 47/105* | (2020.01) |
| *H05B 47/175* | (2020.01) |

(52) U.S. Cl.
CPC ............ *B60Q 11/007* (2013.01); *B60Q 1/305* (2013.01); *B60R 16/0315* (2013.01); *H05B 47/105* (2020.01); *H05B 47/175* (2020.01)

(58) Field of Classification Search
CPC ...... B60Q 11/007; B60Q 1/305; H05B 7/175; H05B 47/105; B60R 16/0315
See application file for complete search history.

(56) References Cited

U.S. PATENT DOCUMENTS 8,096,069 B2 * 1/2012 Ishikawa ............... G09F 21/045
345/204
10,272,825 B2 * 4/2019 Frederick ............... B60Q 1/245
(Continued)

FOREIGN PATENT DOCUMENTS

| DE | 102016121514 A1 | 5/2017 |
|---|---|---|
| WO | 2017123880 A1 | 7/2017 |

OTHER PUBLICATIONS

International Search Report and Written Opinion of the International Searching Authority dated Nov. 20, 2019 for the corresponding PCT Application No. PCT/US2019/052091.

*Primary Examiner* — Phung Nguyen (57) ABSTRACT

A method for controlling one or more vehicle lights of a vehicle during execution of a vehicle function based on image analysis is provided. The method includes receiving instructions to analyze one or more images captured by a camera supported by the vehicle. The method also includes transmitting instructions to a vehicle light system including the one or more lights positioned within a vicinity of the camera. The instructions causing a change in a current state of the one or more lights to a temporary state. During the temporary state, the method includes receiving one or more images from the camera, and identifying one or more reference points within the one or more images.

16 Claims, 4 Drawing Sheets

(56) References Cited

U.S. PATENT DOCUMENTS

| | | |
|---|---|---|
| 2004/0233284 A1 | 11/2004 | Lesesky et al. |
| 2012/0185131 A1 | 7/2012 | Headley |
| 2014/0085472 A1 | 3/2014 | Vanophem |
| 2014/0160276 A1* | 6/2014 | Pliefke .................. B62D 13/06 |
| | | 348/118 |
| 2014/0172232 A1 | 6/2014 | Rupp et al. |
| 2014/0200759 A1 | 7/2014 | Johnson |
| 2015/0345938 A1* | 12/2015 | Salter .................. G01B 11/272 |
| | | 116/28 R |
| 2015/0345939 A1* | 12/2015 | Salter .................. H05B 47/11 |
| | | 356/138 |
| 2017/0043806 A1 | 2/2017 | Muharemovic et al. |

* cited by examiner

ILLUMINATION FOR CAMERA BASED AUTOMOTIVE TRAILER FUNCTION

CROSS REFERENCE TO RELATED APPLICATIONS

This U.S. patent application claims priority under 35 U.S.C. § 119(e) to U.S. Provisional Application 62/733,679, filed on Sep. 20, 2018, which is hereby incorporated by reference in its entirety.

TECHNICAL FIELD

This disclosure relates to a tow vehicle configured to attach to a trailer. The tow vehicle provides rear illumination to view the trailer.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some examples, the trailer is electrically connected to the tow vehicle. As such, the electrical connection allows the trailer to take the feed from the powered vehicle's rear light circuit, allowing the trailer to have taillights, turn signals, and brake lights that are in sync with the powered vehicle's lights.

Some vehicles may be equipped with a trailer reverse assist functionality that aids the driver in maneuvering the trailer while driving the tow vehicle backwards. In some examples, the vehicle is equipped with a trailer knob that gives the driver the sensation that he/she is steering an attached trailer directly while backing up rather than steering the vehicle rearwards resulting in pushing the trailer rearwards. As such, a trailer reverse assist functionality gives the driver the intuitive feel when the driver is driving in the rearward direction and turning the knob to one direction, then the trailer turns to the same direction. This results in a simpler and easier way to maneuver the trailer while backing up. When the vehicle is connected to the trailer, the driver usually manually enters the length of the trailer, in addition to several other trailer parameters, allowing the tow vehicle to better maneuver the trailer in both forward and rearward directions and to allow the trailer reverse assist functionality to be activated. In some examples, the tow vehicle activates the trailer reverse assist (or any other trailer reverse function). Once activated, the trailer reverse assist requires knowledge of trailer parameters including the relative angle of the trailer '$\alpha_T$' to the host/towing vehicle, and the hitch to center trailer axis length $L_T$.

The current state of the art method to input these trailer parameters involves measuring lengths manually and applying a specific sticker (or target) to the trailer which is designed for sensor system to detect. Optionally, the trailer parameters may be learnt by other means of image processing. Current systems require rear-view cameras to detect a target sticker on the trailer; other systems require the camera to track the trailer by means of reference/tracking; points or edges. Therefore, a problem arises for these systems when there is not enough light present on the trailer for the system to detect the trailer or the sticker on the trailer.

SUMMARY

One aspect of the disclosure provides a method for controlling one or more vehicle lights of a vehicle during execution of a vehicle function based on image analysis. The vehicle function may include any function that includes image analysis, for examples a trailer reverse assist function. In some examples, the one or more lights are facing a rearward direction with respect to the vehicle and are configured to illuminate a trailer attached to the vehicle. The method includes receiving, at data processing hardware, (i.e., the vehicle controller), instructions to analyze one or more images captured by a camera in communication with the data processing hardware. The received instructions are triggered by the beginning of execution of the vehicle function. The method includes transmitting, from the data processing hardware, instructions to a vehicle light system that includes one or more lights positioned within a vicinity of the camera such that the one or more light illuminate captured images. The instructions cause a change in a current state of the one or more lights to a temporary state. During the temporary state, the method includes receiving, at the data processing hardware one or more images from the camera. In addition, during the temporary state, the method includes identifying, at the data processing hardware, one or more reference points within the one or more images.

Implementations of the disclosure may include one or more of the following; optional features. In some implementations, during the temporary state, the method includes sending instructions to a display in communication with the data processing hardware. The instructions cause the display to show the one or more images. In some examples, the change in current state of the one or more lights includes a change from an off-state to an on-state, where the on-state is the temporary state, or vice-versa. During the temporary state, an intensity of the lights may be modulated. The temporary state of the one or more lights may include outputting light based on a pulse width modulation signal. The pulse width modulation signal may be synchronized with an acquisition timing of the camera image. When the execution of the vehicle function is complete, the method includes transmitting instructions to the vehicle light system causing a change in the temporary state of the one or more lights back to the current state.

Another aspect of the disclosure provides a system for controlling one or more vehicle lights of a vehicle during execution of a vehicle function based on image analysis. The system includes: a camera; a vehicle light system that includes one or more lights positioned within a vicinity of the camera; data processing hardware in communication with the camera and the vehicle light system; and memory hardware in communication with the data processing hardware. The memory hardware stores instructions that when executed on the data processing hardware cause the data processing hardware to perform operations that include the method described above.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. It is desirable for a tow vehicle to have a vehicle light system that provides rearward illuminations for trailer reverse assist functions or other vehicle function that need rearward vehicle illumination.

Figure 1A:
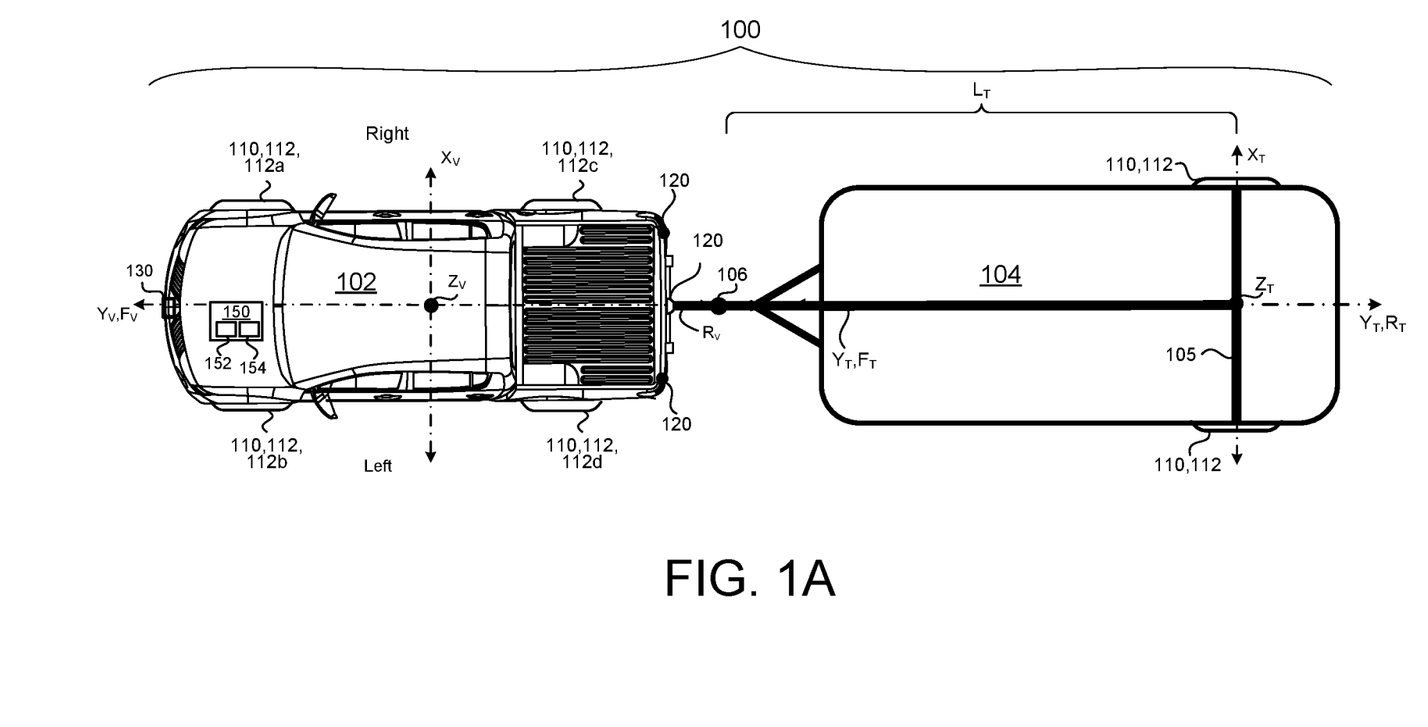
FIGS. 1A and 1B are perspective views of an exemplary tow vehicle hitched to a trailer.
Figure 1B:
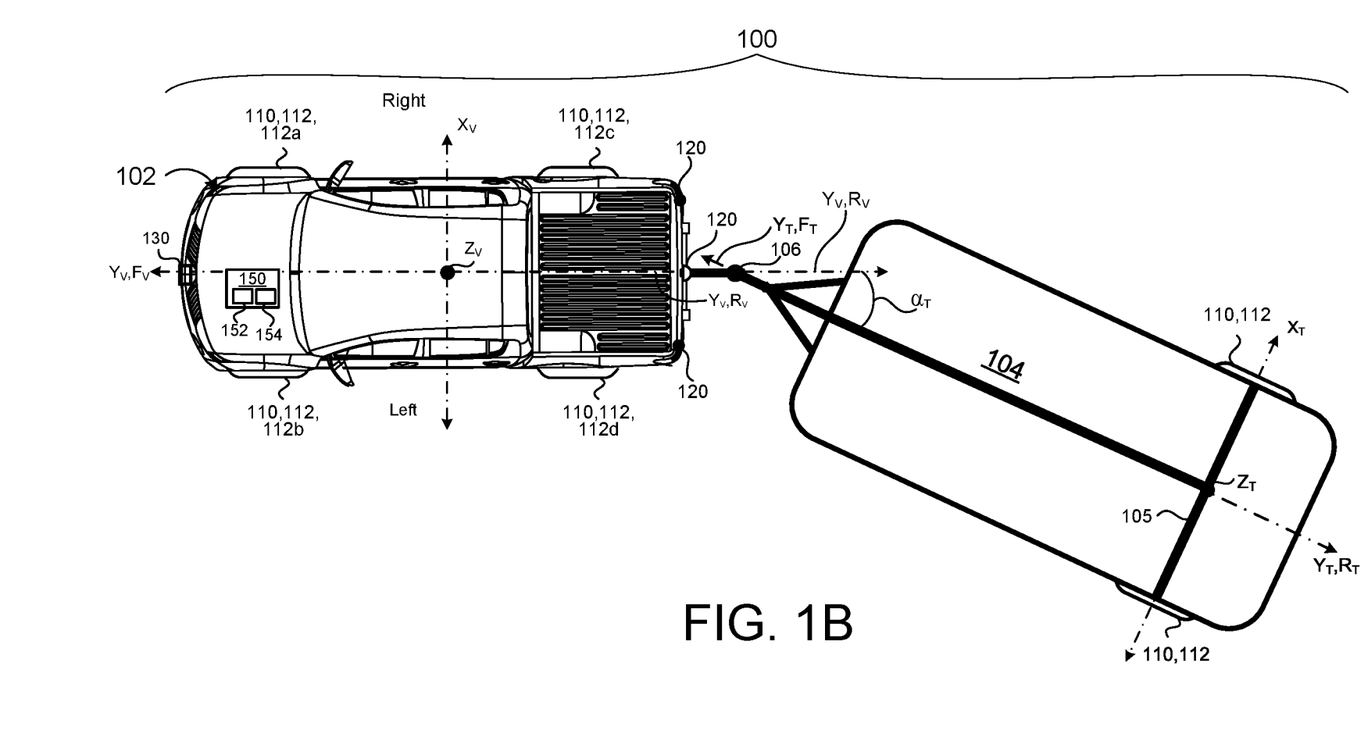

Referring to FIGS. 1A-22, in some implementations, a vehicle-trailer system 100 includes a tow vehicle 102 hitched to a trailer 104 by way of a hitch 106. The tow vehicle 102 includes a drive system 110 associated with the tow vehicle 102 that maneuvers the tow vehicle 102 and thus the vehicle-trader system 100 across a road surface based on drive maneuvers or commands having x, y, and z components, for example. As shown, the drive system 110 includes a front right wheel 112, 112a, a front left wheel 112, 112b, a rear right wheel 112, 112c, and a rear left wheel 112, 112d, In addition, the drive system 110 may include wheels (not shown) associated with the trailer 104. The drive system 110 may include other wheel configurations as well. The drive system 110 may include a motor or an engine that converts one form of energy into mechanical energy allowing the vehicle 102 to move. The drive system 110 includes other components (not shown) that are in communication with and connected to the wheels 112 and engine and that allow the vehicle 102 to move, thus moving the trailer 104 as well. The drive system 110 may also include a brake system 114 that includes brakes (not shown) associated with each wheel 112, 112a-d, where each brake is associated with a wheel 112a-d and is configured to slow down or stop the wheel 112a-n from rotating. In some examples, the brake system 114 is connected to one or more brakes supported by the trailer 104. The drive system 110 may also include an acceleration system that is configured to adjust a speed of the tow vehicle 102 and thus the vehicle-trailer system 100, and a steering system that is configured to adjust a direction of the tow vehicle 102 and thus the vehicle-trailer system 100. The vehicle-trailer system 100 may include other systems as well.

The tow vehicle 102 may move across the road surface by various combinations of movements relative to three mutually perpendicular axes defined by the tow vehicle 102: a transverse axis $X_V$, a fore-aft axis $Y_V$, and a central vertical axis $Z_V$. The transverse axis $X_V$, extends between a right side R and a left side of the tow vehicle 102. A forward drive direction along the fore-aft axis $Y_V$ is designated as $F_V$, also referred to as a forward motion. In addition, an aft or rearward drive direction along the fore-aft direction $Y_V$ is designated as $R_V$, also referred to as rearward motion. In some examples, the tow vehicle 102 includes a suspension system (not shown), which when adjusted causes the tow vehicle 102 to tilt about the $X_V$ axis and or the $Y_V$ axis, or move along the central vertical axis $Z_V$. As the tow vehicle 102 moves, the trailer 104 follows along a path of the tow vehicle 102. Therefore, when the tow vehicle 102 makes a turn as it moves in the forward direction $F_V$, then the trailer 104 follows along. While turning, the tow vehicle 102 and the trailer 104 form a trailer angle $\alpha_T$.

Moreover, the trailer 104 follows the tow vehicle 102 across the road surface by various combinations of movements relative to three mutually perpendicular axes defined by the trailer 104: a trailer transverse axis $X_T$, a trailer fore-aft axis $Y_T$, and a trailer central vertical axis $Z_T$. The trailer transverse axis $X_T$, extends between a right side R and a left side of the trailer 104 along the trailer axle 105. A forward drive direction along the trailer fore-aft axis $Y_T$ is designated as $F_T$, also referred to as a forward motion. In addition, a trailer aft or rearward drive direction along the fore-aft direction $Y_T$ is designated as $R_T$, also referred to as rearward motion. Therefore, movement of the vehicle-trailer system 100 includes movement of the tow vehicle 102 along its transverse axis $X_V$, fore-aft axis $Y_V$, and central vertical axis $Z_V$, and movement of the trailer 104 along its trailer transverse axis $X_T$, trailer fore-aft axis $Y_T$, and trailer central vertical axis $Z_T$. Therefore, when the tow vehicle 102 makes a turn as it moves in the forward direction $F_V$, then the trailer 104 follows along. While turning, the tow vehicle 102 and the trailer 104 form the trailer angle $\alpha_T$ being an angle between the vehicle fore-aft axis $Y_V$ and the trailer fore-aft axis $Y_T$.

Figure 2:
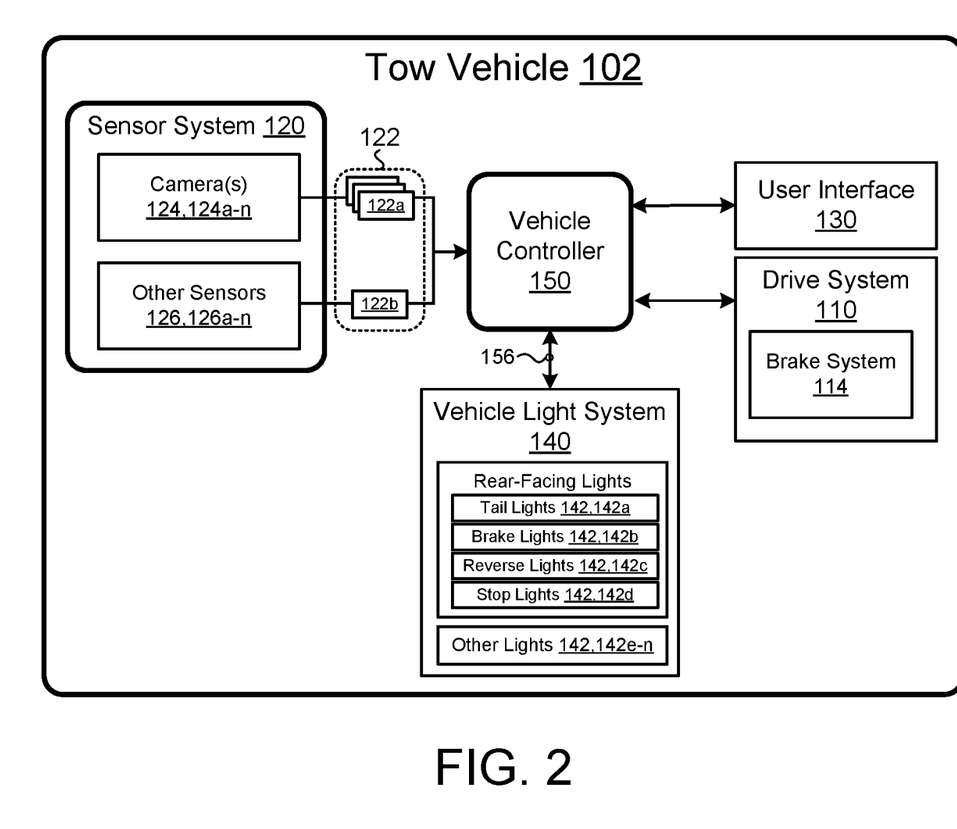
FIG. 2 is a schematic view of an exemplary tow vehicle including a vehicle light system.

In some implementations, the vehicle 102 includes a sensor system 120 to provide sensor system data 122 that may be used to determine one or more measurements, such as, a trailer axle length $L_T$ (being the length from the hitch point 106 to the trailer axle 105). In some examples, the vehicle 102 may be autonomous or semi-autonomous, therefore, the sensor system 120 provides reliable and robust autonomous driving. The sensor system 120 provides sensor system data 122 and may include different types of sensors 124 that may be used separately or with one another to create a perception of the tow vehicle's environment or a portion thereof that is used by the vehicle-trailer system 100 to identify object(s) in its environment and/or in some examples autonomously drive and make intelligent decisions based on objects and obstacles detected by the sensor system 120. In some examples, the sensor system 120 is supported by the rear portion of the tow vehicle 102 and provides sensor system data 122 associated with object(s) and the trailer 104 positioned behind the tow vehicle 102. The tow vehicle 102 may support the sensor system 120; while in other examples, the sensor system 120 is supported by the vehicle 102 and the trailer 104. The sensor system 120 may include, but not limited to, one or more imaging devices 124, 124a-n (such as camera(s)), and sensors 126, 126a-n such as, but not limited to, radar, sonar, LIDAR (Light Detection and Ranging, which can entail optical remote sensing that measures properties of scattered light to find range and/or other information of a distant target), LADAR (Laser Detection and Ranging), ultrasonic sensors, etc. The sensor system 120 provides sensor system data 122 that includes images 122a from the one or more cameras 124 and sensor data 122b from the one or more sensors 126b, 126a-n. Therefore, the sensor system 120 is especially useful for receiving information of the environment or portion of the environment of the vehicle and for increasing safety in the vehicle-trailer system 100 which may operate by the driver or under semi-autonomous or autonomous conditions. In some implementations, the sensor system 120 includes a controller (not shown) that processes the sensor system data 122, while in other examples, the sensor system 120 sends the received sensor system data 122 to the vehicle controller 150 which in turn processes the received data 122 (as shown in FIG. 2).

The tow vehicle 102 may include a user interface 130, such as a display. The user interface 130 is configured to display information to the driver. In some examples, the user interface 130 is configured to receive one or more user commands from the driver via one or more input mechanisms or a touch screen display and/or displays one or more notifications to the driver. In some examples, the user interface 130 is a touch screen display. In other examples, the user interface 130 is not a touchscreen and the driver may use an input device, such as, but not limited to, a rotary knob or a mouse to make a selection. In some examples, the driver may interact with the user interface 130 to turn on or off a "rearward vehicle light" feature (associated with a vehicle light system 140).

The tow vehicle 102 includes a vehicle light system 140 that includes rear-ward facing lights 142, 142a-d, such as, but not limited to, tail lights 142a, brake lights 142b, reverse lights 142c, and center high mount stop lights (CHMSL) 142d. In addition, the vehicle light system 140 includes other lights 142, 142e-n such as front facing lights and side facing lights.

The sensor system 120, the user interface 130, and the vehicle light system 140 are in communication with a vehicle controller 150. The vehicle controller 150 includes a computing device (or data processing hardware) 152 (e.g., central processing unit having one or more computing processors) in communication with non-transitory memory or hardware memory 154 (e.g., a hard disk, flash memory, random-access memory) capable of storing instructions executable on the computing processor(s)). In some example, the non-transitory memory 154 stores instructions that when executed on the computing device 152 cause the vehicle controller 150 to provide a signal or command 156 to the vehicle light system 140 causing the vehicle light system 140 to adjust one or more lights 142, 142a-n. As shown, the vehicle controller 170 is supported by the tow vehicle 102; however, the vehicle controller 150 may be separate from the tow vehicle 102 and in communication with the tow vehicle 102 via a network (not shown).

In some implementations, vehicle functions that relate to visualization and detection of Object(s) based on received sensor system data 122, such as camera images 122a, may not work in dark lighting conditions. In such cases, the vehicle controller 150 instructs the vehicle light system 140 to illuminate one or more vehicle lights 142, 142a-n to improve the images 122a captured by the camera 124. For examples, a camera 124 positioned on a rear portion of the vehicle 102 captures images 122a of the trailer 104 and the controller 150 determines one or more trailer parameters based on the received images 122a. Additionally or alternatively, a camera 124 may be positioned next to the center high mounted stop light 142d which captures images 122a of the trailer 104 which are then processed by the controller 150 to determine the one or more trailer parameters. The controller 150 may identify one or more reference points within each received image 122a associated with the trailer 104; however, in dark lighting conditions, the camera 124 may not be able to capture images 122a that when processed identify the reference points for tracking them during a movement of the tow vehicle 102. In this case, the vehicle controller 150 instructs the vehicle light system 140 to illuminate one or more vehicle rear facing lights 142, 142a-d so that the camera 124 captures better images 122a to be analyzed by the controller 150. The reference points within the images 122a that are identified and tracked by the sensor system 122 and the controller 150 may be, but are not limited to, a target sticker, an icon, trailer edge(s), or any other indicia on the trailer 104 already present or introduced by the customer. The vehicle controller 150 identifies the reference points within the images 122a by applying any image processing or machine vision techniques, such as, but not limited to a histogram.

In some implementations, a vehicle function associated with analyzing received images 122a is calibrated by instructing the driver or the drive system 110 (for autonomous or semi-autonomous driving) to execute one or more driving maneuvers. During calibration, the vehicle controller 150 may instruct the vehicle light system 140 to switch on a single light 142 or multiple lights 142, 142a-n continuously to have an even illumination thought the maneuver, where the single light 142 or multiple lights 142, 142a-n are positioned such that the camera(s) 124 captures illuminated images 122a that are capable of being processed due to the even illumination provided by the vehicle light system 140. For examples, the trailer reverse assist function is calibrated by instructing the driver or the drive system 110 to execute one or more driving maneuvers. The vehicle controller 150 instructs the vehicle light system 140 to switch on a single rear-facing light 142a-d or multiple rear-facing lights 142a-d continuously to have an even illumination thought the maneuver, where the single rear-facing light 142a-d or multiple rear-facing lights 142a-d illuminate the trailer 104 allowing the camera 124 to capture illuminated images 122a that allow the controller 150 to identify one or more reference points within the captured images 122a.

In some examples, the controller 150 may process the images 122a with no illumination and then based on the received and process images 122a, the controller 150 may instruct the vehicle light system 140 to illuminate one or more lights 142 positioned in the vicinity of the camera 124. In other examples, the controller may process the sensor system data 122 with minimum illuminations (one or two lights 142 turned on), then the controller 150 may adaptively increase the number of illumination sources or lights 142 used so as to have successful detection and tracking of the one or more objects (e.g., a trailer 104 attached to the tow vehicle 102).

In some implementations, the controller 150 instructs the vehicle light system 140 to turn the brake lights 142b on to illuminate the trailer 104. In this case, the brake light 142b will stay switched on even if the brakes are not applied. The trailer brake lights are responsive to actual use of the brakes.

In some implementations, the controller 150 does not instruct the vehicle light system 140 to turn on the brake lights 142b, but instead instructs the vehicle light system 140 to turn on other rear-facing lights 142a-d to illuminate the trailer 104. In this case, when the brakes are applied, the vehicle controller 150 prevents the brake system 114 from illuminating the vehicle brake lights 142b; however, the brake lights of the trailer 104 are turned on. As such, the controller 150 provides consistent illumination of the trailer 104 which ensures better tracking of the target within the captured images 122a due to the non-change in the illumination provided.

In some implementations, the controller 150 instructs the vehicle light system 140 to turn the reverse lights 142.c on to illuminate the trailer 104. In this case, the reverse lights 142c will stay switched on even if the reverse gear is not engaged. Only the trailer reverse lights are responsive to actual use of the reverse gear.

In some implementations, the controller 150 does not instruct the vehicle light system 140 to turn on the reverse lights 142c of the tow vehicle 102, but instead instructs the vehicle light system 140 to turn on other rear-facing lights 142a, 142b, 142d to illuminate the trailer 104. In this case, when the driver switches to the reverse gear, the vehicle controller 150 prevents the reverse lights 142c from illuminating the trailer 104; however, the reverse lights of the trailer 104 are turned on when the reverse gear is engages. As such, the controller 150 provides consistent illumination of the trailer 104 which ensures better tracking of the target within the captured images 122a due to the non-change in the illumination provided.

In some implementations, the controller 150 instructs the vehicle light system 140 that the lights 142 are left switched on constantly, but the intensity is be digitally pulse width modulated. The camera's image capture and light illumination is synchronized so that all the images 122a obtained by the camera 124 are evenly illuminated. In one example, if the camera frequency is at 30 Hz, one of the lights 142, 142a-d, say brake lights, 142b will also be pulse width modulated at 30 Hz with a low duty cycle. The phase of the modulation is adjusted by the vehicle controller 150, as per the camera's image acquisition. When the vehicle brakes are not applied, the lights 142b are supplied with high voltage when a camera aperture is open, and with low voltage when the camera aperture is closed. This will enable all images 122a acquired to be illuminated with high brightness, while a normal human perceives the light to be illuminated at a low brightness and understand that the tail lights are on. When the vehicle brakes are applied, the brake lights 142b will be constantly supplied with high voltage. A normal human will perceive a brighter brake lights and understand that the brakes are applied. All the images 122a acquired will also be illuminated with high brightness, similar to the case when brakes were not applied. Thus, all the images acquired will be of the same illumination irrespective of whether the brakes are applied or not. Optionally, the vehicle controller 150 instructs the vehicle light system 140 to cause the lights 142 to digitally pulse width modulate (e.g., on or off briefly—for as long as the camera's aperture speed dictates) in the same frequency as the camera. In one example, if the camera frequency is at 30 Hz, one of the lights, say reverse lights, 142c will also be pulse width modulated at 30 Hz with a high duty cycle when it is required to be illuminated. The phase of the modulation will be adjusted by the vehicle controller 150, as per the camera's image acquisition. When the reverse gear is engaged, the lights 142c are supplied with no voltage when the camera aperture is open, and with high voltage when the camera aperture is closed. This enables all images 122a acquired to be illuminated with low brightness, since the reverse lights 142c are switched off when camera aperture is open. Meanwhile, a normal human perceives the light to be switched on and understand that the reverse gear is engaged. When the reverse gear is not engaged, the reverse lights will constantly be switched off. A normal human will understand that the reverse gear is not engaged. All the images acquired will also be illuminated with low brightness. Thus, all the images acquired will be of the same illumination irrespective of whether the reverse gear is engaged or not.

Optionally, the various rear-ward facing lights 142a-d of the tow vehicle 102 may be substituted with similar colored lights that have wavelengths that extend into the infra-red spectrum. These similar colored lights may be used to illuminate the trailer 104 for trailer reverse assist function, for calibration maneuver, or any other function associated with image analysis, and an image processing may be carried out on the infrared spectrum alone. This will enable the driver to perceive normal operation of all lights.

Figure 3:
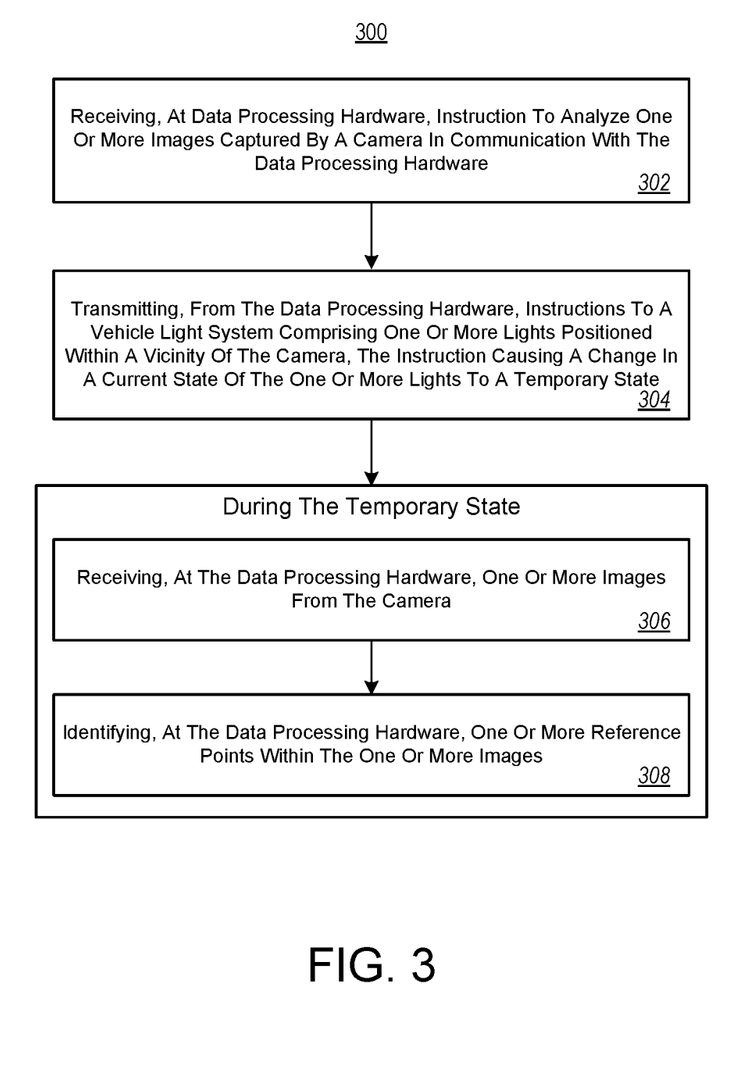
FIG. 3 is a schematic view of an exemplary arrangement of operations for adjusting one or more lights of a vehicle light system.

In some implementations, the lights 142 resume normal operation function is not being used or calibration maneuver for the trailer maneuvers are not being done, FIG. 3 provides an example arrangement of operations of a method 300 for controlling one or more vehicle lights 142, 142a-d of a vehicle 102 during execution of a vehicle function based on image analysis, using the system described in FIGS. 1A-2. The vehicle function may include any function that includes image analysis, for examples a trailer reverse assist function. In some examples, the one or more lights 142, 142a-d are facing a rearward direction with respect to the vehicle 102 and are configured to illuminate a trailer 104 attached to the vehicle 102. At block 302, the method 300 includes receiving, at data processing hardware 152, (i.e., the vehicle controller 150), instructions to analyze one or more images 122a captured by a camera 124 in communication with the data processing hardware 150. The received instructions are triggered by the beginning of execution of the vehicle function. At block 304, the method 300 includes transmitting, from the data processing hardware 150, 152, instructions to a vehicle light system 140 that includes one or more lights 142, 142a-d positioned within a vicinity of the camera 124. The instructions causing a change in a current state of the one or more lights 142, 142a-d to a temporary state, During the temporary state, at block 306, the method 300 includes receiving, at the data processing hardware 150, 152, one or more images 122a from the camera 124. In addition, at block 308, during the temporary state, the method 300 includes identifying, at the data processing hardware 150, 152, one or more reference points within the one or more images 122a.

In some implementations, during the temporary state, the method includes sending instructions to a display 130 in communication with the data processing hardware 150, 152. The instructions causing the display 130 to show the one or more images 122a. In some examples, the change in current state of the one or more lights 142 includes a change from an off-state to an on-state, where the on-state is the temporary state, or vice-versa, during the temporary state, an intensity of the lights 142 may be modulated. The temporary state of the one or more lights may include outputting light based on a pulse width modulation signal. The pulse width modulation signal may be synchronized with an acquisition timing of the camera image. When the execution of the vehicle function is complete, the method 300 includes transmitting instructions to the vehicle light system 140 causing a change in the temporary state of the one or more lights back to the current state.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for controlling one or more vehicle lights of a vehicle during execution of a vehicle function based on image analysis, the method comprising:

receiving, at data processing hardware, instructions to analyze one or more images captured by a camera in communication with the data processing hardware;

transmitting, from the data processing hardware, instructions to a vehicle light system comprising one or more lights positioned within a vicinity of the camera, the instructions causing a change in a current state of the one or more lights to a temporary state;

during the temporary state:

receiving, at the data processing hardware, one or more images from the camera; and identifying, at the data processing hardware, one or more reference points within the one or more images;

wherein the instructions to the vehicle light system include outputting light based on a pulse width modulation signal synchronized with an acquisition timing of the one or more images.

2. The method of claim 1, further comprising, during the temporary state:

sending instructions to a display in communication with the data processing hardware, the instructions causing the display to show the one or more images.

3. The method of claim 1, wherein the vehicle function includes a trailer reverse assist function.

4. The method of claim 1, wherein the one or more lights are facing a rearward direction with respect to the vehicle and are configured to illuminate a trailer attached to the vehicle.

5. The method of claim 1, wherein the change in current state of the one or more lights includes a change from an off-state to an on-state, the on-state being the temporary state, or vice-versa.

6. The method of claim 1, wherein during the temporary state, an intensity of the one or more lights is modulated.

7. The method of claim 1, further comprising, when the execution of the vehicle function is complete, transmitting instructions to the vehicle light system causing a change in the temporary state of the one or more lights back to the current state.

8. A system for controlling one or more vehicle lights of a vehicle during execution of a vehicle function based on image analysis, the system comprising:

a camera;

a vehicle light system comprising one or more lights positioned within a vicinity of the camera;

data processing hardware in communication with the vehicle light system and the camera; and memory hardware in communication with the data processing hardware, the vehicle light system, and the camera, the memory hardware storing instructions that when executed on the data processing hardware cause the data processing hardware to perform operations comprising:

receiving instructions to analyze one or more images captured by the camera;

transmitting instructions to the vehicle light system, the instructions causing a change in a current state of the one or more lights to a temporary state;

during the temporary state:
receiving one or more images from the camera; and
identifying one or more reference points within the one or more images
wherein the instructions to the vehicle light system include outputting light based on a pulse width modulation signal synchronized with an acquisition timing of the one or more images.

9. The system of claim 8, wherein during the temporary state, the operations further include:
sending instructions to a display in communication with the data processing hardware, the instructions causing the display to show the one or more images.

10. The system of claim 8, wherein the vehicle function includes a trailer reverse assist function.

11. The system of claim 8, wherein the one or more lights are facing a rearward direction with respect to the vehicle and are configured to illuminate a trailer attached to the vehicle.

12. The system of claim 8, wherein the change in current state of the one or more lights includes a change from an off-state to an on-state, the on-state being the temporary state, or vice-versa.

13. The system of claim 8, wherein during the temporary state, an intensity of the one or more lights is modulated.

14. The system of claim 8, wherein the temporary state of the one or more lights includes outputting light based on a pulse width modulation signal.

15. The system of claim 14, wherein the pulse width modulation signal is synchronized with an acquisition timing of the one or more images.

16. The system of claim 8, wherein when the execution of the vehicle function is complete, the operations further comprise:
transmitting instructions to the vehicle light system causing a change in the temporary state of the one or more lights back to the current state.

\* \* \* \* \*